(12) United States Patent
Helmenstein

(10) Patent No.: US 10,359,053 B2
(45) Date of Patent: Jul. 23, 2019

(54) AIR SUPPLY DEVICE

(71) Applicant: GENTHERM GMBH, Odelzhausen (DE)

(72) Inventor: Winfried Helmenstein, München (DE)

(73) Assignee: GENTHERM GMBH, Odelzhausen (DE)

( * ) Notice: Subject to any disclaimer, the term of this patent is extended or adjusted under 35 U.S.C. 154(b) by 607 days.

(21) Appl. No.: 15/027,605

(22) PCT Filed: Oct. 8, 2014

(86) PCT No.: PCT/DE2014/000494
§ 371 (c)(1),
(2) Date: Apr. 6, 2016

(87) PCT Pub. No.: WO2015/051777
PCT Pub. Date: Apr. 16, 2015

(65) Prior Publication Data
US 2016/0245309 A1    Aug. 25, 2016

(30) Foreign Application Priority Data
Oct. 8, 2013    (DE) .................. 10 2013 016 655

(51) Int. Cl.
*F04D 29/66*    (2006.01)
*F04D 29/52*    (2006.01)
(Continued)

(52) U.S. Cl.
CPC .......... *F04D 29/668* (2013.01); *B60N 2/5657* (2013.01); *F04D 17/08* (2013.01); *F04D 19/002* (2013.01); *F04D 25/0613* (2013.01); *F04D 25/08* (2013.01); *F04D 29/281* (2013.01); *F04D 29/325* (2013.01); *F04D 29/4206* (2013.01); *F04D 29/522* (2013.01);
(Continued)

(58) Field of Classification Search
CPC ...... F04D 29/668; F04D 17/08; F04D 19/002; F04D 25/0613; F04D 25/08; F04D 29/281; F04D 29/325; F04D 29/4206; F04D 29/522; F04D 29/624; F04D 29/644; F04D 29/646; H02K 5/24; B60N 2/5657
See application file for complete search history.

(56) References Cited

U.S. PATENT DOCUMENTS 2,936,141 A  *  5/1960  Rapata .................... F16C 27/02
                                                      248/604
3,494,678 A     2/1970  Reznick et al.
(Continued)

FOREIGN PATENT DOCUMENTS

DE        870599       3/1953
DE       19954978 C1   11/1999
(Continued)

OTHER PUBLICATIONS

International Search Report and Written Opinion dated Jun. 17, 2015 for Application No. PCT/DE2014/000494.

*Primary Examiner* — Richard A Edgar
(74) *Attorney, Agent, or Firm* — The Dobrusin Law Firm, P.C.; Daniel P. Aleksynas

(57) ABSTRACT

The invention relates to an air supply device (7), comprising a blade wheel (9) and a housing (13) which delimits the blade wheel relative to the surroundings at least to some extent.

20 Claims, 2 Drawing Sheets

(51) Int. Cl.
- *F04D 29/64* (2006.01)
- *F04D 25/06* (2006.01)
- *B60N 2/56* (2006.01)
- *F04D 17/08* (2006.01)
- *F04D 19/00* (2006.01)
- *F04D 25/08* (2006.01)
- *F04D 29/28* (2006.01)
- *F04D 29/32* (2006.01)
- *F04D 29/42* (2006.01)
- *F04D 29/62* (2006.01)

(52) U.S. Cl.
CPC ......... *F04D 29/624* (2013.01); *F04D 29/644* (2013.01); *F04D 29/646* (2013.01)

(56) References Cited

U.S. PATENT DOCUMENTS

| | | | |
|---|---|---|---|
| 4,259,896 A | 4/1981 | Hayashi et al. | |
| 4,509,792 A | 4/1985 | Wang | |
| 4,671,567 A | 6/1987 | Frobose | |
| 6,003,950 A | 12/1999 | Larsson | |
| 6,224,150 B1 | 5/2001 | Eksin et al. | |
| 6,676,207 B2 | 1/2004 | Rauh et al. | |
| 6,761,399 B2 | 7/2004 | Bargheer et al. | |
| 7,189,053 B2 * | 3/2007 | Winkler | B29C 45/0062 415/108 |
| 7,213,876 B2 | 8/2007 | Stoewe | |
| 7,475,938 B2 | 1/2009 | Stoewe | |
| 7,862,113 B2 | 1/2011 | Knoll | |
| 7,885,065 B2 * | 2/2011 | Kaneko | F04D 25/0613 361/679.48 |
| 8,162,391 B2 | 4/2012 | Lazanja et al. | |
| 8,888,573 B2 | 11/2014 | Bajic et al. | |
| 2005/0067862 A1 | 3/2005 | Iqbal et al. | |
| 2005/0069407 A1 | 3/2005 | Winkler et al. | |
| 2008/0042039 A1 * | 2/2008 | Krempel | B60H 1/00457 248/560 |

FOREIGN PATENT DOCUMENTS

| | | | | |
|---|---|---|---|---|
| DE | 10024880 C1 | 5/2000 | | |
| EP | 1266794 A2 | 12/2002 | | |
| JP | 2011104246 A | * | 6/2011 | ........... B60N 2/5657 |

* cited by examiner

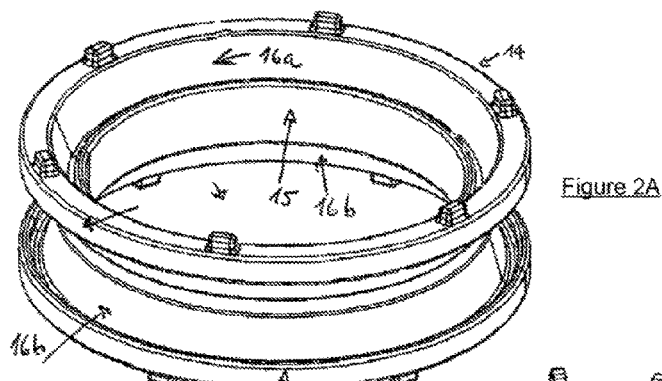
Figure 2A
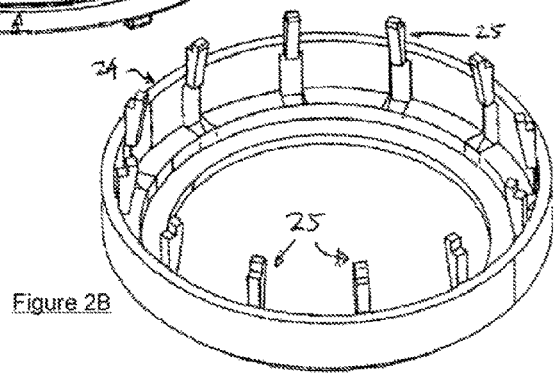
Figure 2B
Figure 2C
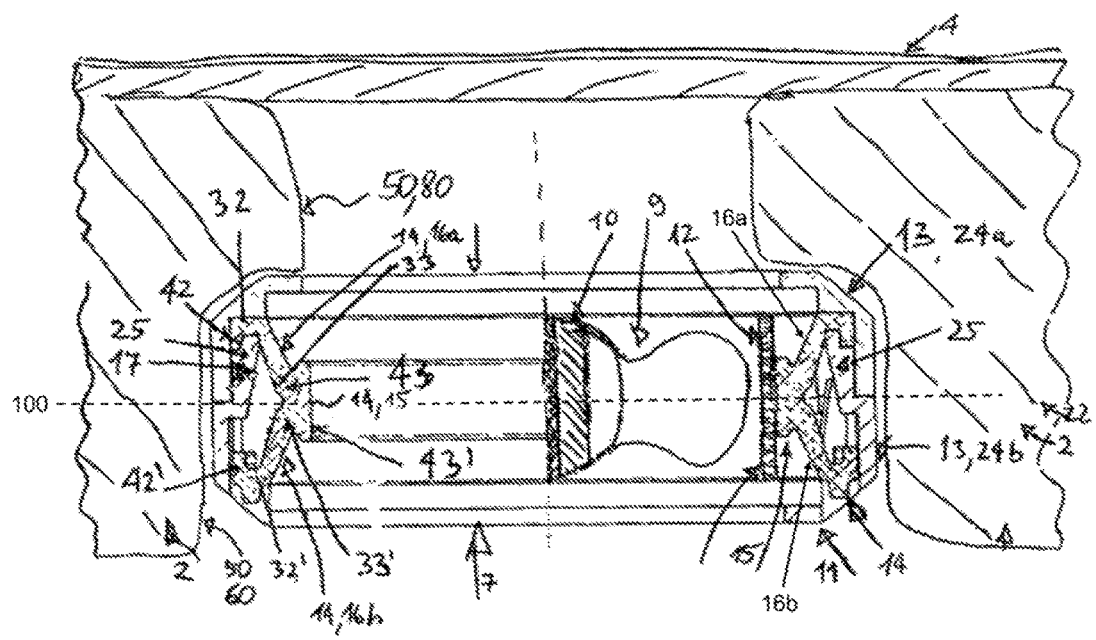

AIR SUPPLY DEVICE

BACKGROUND OF THE INVENTION

The invention relates to an air supply device.

Inexpensive blowers often generate vibrations. This is undesirable for many applications. In such cases, one can balance the blade wheel of the ventilator. However, this process entails costs.

For many applications it is therefore desirable to further improve a ventilation device with regard to the stability and manufacturing costs thereof.

SUBJECT MATTER OF THE INVENTION

On this background, a technical concept having the features of claim 1 is proposed. Additional advantageous designs can be obtained from the additional claims and from the following description.

An air supply device 7 with a blade wheel 9 and a housing 13 which delimits the blade wheel relative to the surroundings at least to some extent is particularly low-vibration if the blade wheel 9 is spring-mounted relative to the housing 13 and if, relative to the housing 9, with application of a force of equal magnitude, the blade wheel 9 can be deflected farther radially with respect to the rotation axis of the blade wheel 9 than along the rotation axis of the blade wheel 9. This applies especially to blowers, particularly to an axial blower or a radial blower.

If the air supply device 7 comprises a blade wheel support 12, relative to which the blade wheel 9 is movably mounted, and which supports the blade wheel 9 at least partially, and if the air supply device 7 comprises an uncoupling device 14, in order to space the blade wheel support 12 and the housing 13 apart from one another, and uncouples the housing 13 from the vibrations of the blade wheel support 12 and of the blade wheel 9, this increases the comfort of a user and allows a simple assembly.

In an air supply device 7, if at least one of the functional components, in particular a blade wheel support 12 and/or an uncoupling device 14, is arranged within the housing 13, this allows, in comparison to conventional external spring suspensions, a simplified assembly, a more compact installation space and simpler cleaning.

If the housing 13 of an air supply device 7 has at least two partial shells 24, the blade wheel 9 and/or its support structure can be encased more than would be possible with a single-piece housing.

If two partial shells 24 *a, b* have an identical shape, this reduces the part types needed. If partial shells 24 *a, b* are rotationally symmetrical, this simplifies the assembly thereof.

If the rotation axes of two partial shells 24 *a, b* are positioned extending on the same straight line, the parts thereof can be positioned in a simple manner congruently with one another.

If the rotation axes of partial shells 24 *a, b* are arranged identically to the rotation axis of the blade wheel 9, they have the same spacing everywhere relative to the rotating blade wheel.

If, relative to the rotation plane of the blade wheel 9, two partial shells 24 *a, b* are arranged at least partially on mutually different sides of the blade wheel 9, this allows a delimitation of the blade wheel not only laterally, but also in parts in front of and behind the blade wheel relative to the rotation plane of the blade wheel.

If a partial shell is in a mirror arrangement relative to another partial shell and arranged rotated about the rotation axis of the blade wheel by an angle greater than 0 and less than 180 degrees, then protrusions provided on the partial shells can engage interlockingly in one another, in spite of the fact that the partial shells are shaped identically. If two partial shells 24 *a, b* each have at least one opening facing the other partial shell and if these openings are of equal size and formed identically, and the margins of the two openings are arranged so that they are congruent to one another, then, as a result, a pressure resistant housing can be assembled in a simple way.

It is advantageous that the uncoupling device 14 comprises at least two force introduction areas 32, 32', 33, 33' that are spaced apart from one another, one of which is associated with the blade wheel support 12 and the other with the housing 13, and that the uncoupling device 14 comprises at least one force transmission device 16 between two such force introduction areas 32, 32', 33, 33', in order to transmit mechanical forces between the two force introduction areas 32, 32', 33, 33'. This makes it possible to guide longitudinal forces in a force transmission device, for example, a small, membrane-like web. This is advantageous for the transmission of traction or pressure, while lateral forces lead to evasive and compensatory movements due to bending of the thin webs.

It is also advantageous that the force transmission device 16 of an air supply device 7 comprises at least two force introduction areas 32, 32', 33, 33' that are spaced apart from one another, one of which is associated with a blade wheel support 12 and the other with the housing 13, that the uncoupling device 14 comprises at least one connection area 42, 43, 42', 43' where the uncoupling device 14 is connected to the blade wheel support 12 or the housing 13, and that at least one force introduction area 32, 32', 33, 33' is arranged between a connection area 42, 43, 42', 43' and the force transmission device 16. Due to the connection area, the forces do not engage on the housing or the blade wheel support selectively at some points, but instead they are uniformly distributed there.

If the force transmission device 16 has an inclination relative to the rotation axis of the blade wheel 9 that is from zero to 60 degrees, preferably between 5 and 45 degrees, more preferably 20 to 40 degrees, then this makes it possible to reduce the movements of the blade wheel along the rotation axis thereof. As a result, the blade wheel does not inadvertently strike adjacent parts, but instead keeps its lateral mobility within the housing thereof. The same effect is achieved if the force introduction areas 32, 32', 33, 33' of a force transmission device 16 are on a different level relative to the longitudinal extent of the rotation axis of the blade wheel 9. This applies particularly if a straight line drawn through the force introduction areas 32, 32', 33, 33' of a force transmission device 16 and the rotation axis of the blade wheel 9 has an inclination relative to the rotation axis of the blade wheel 9 that is from zero to 60 degrees, preferably between 5 and 45 degrees, more preferably 20 to 40 degrees.

If at least a blade wheel support 12, an uncoupling device 14, a force transmission device 16, a housing 13 or a partial shell 24 are in the shape of a ring that is arranged concentrically about the rotation axis of the blade wheel 9, at least in sections, this allows a simple assembly. Then only a few parts are needed. At the same time, the air supply device is secured in all directions.

It is preferable that at least two force transmission devices 16 are provided, the inclination of which relative to the rotation axis of the blade wheel 9 differs from one to the other, preferably with opposite algebraic signs from one another. This allows an improved delimitation of the deflections along the rotation axis of the blade wheel.

It is particularly advantageous if an uncoupling device 14 comprises two funnel-shaped transmission devices 16, which are arranged in a mirror arrangement, for example, relative to the rotation plane of the blade wheel 9, so that they form a V-shaped profile. This profile is advantageously thickened or broadened at the corners thereof, in order to form broadened connection areas 42, 43, 42', 43'. Thus, in the case of a concentric arrangement, they result in ring-shaped bulges that brace the uncoupling device 14 on the housing 13 or on the blade wheel support 12. They make it possible to distribute the forces transmitted by the force transmission devices 16 over a broader area and prevent local overloads. In cross section, such an uncoupling device 14 thus has a profile in the shape of a K or V with broadened, thickened or angled end points.

If at least one connection area 42, 43, 42', 43' and at least one force transmission device 16 are formed in one piece, this simplifies the assembly and makes it less expensive. This applies particularly if all the components of an uncoupling device 14 are formed in one piece. Elastomer casting materials, polymers, silicone or the like are particularly suitable.

Such air supply devices 9 are particularly suitable for use in seats, fittings or other vehicle components arranged close to the user.

FIGURES

Below, details of the invention are explained. These explanations are intended to make the invention understandable. However, they only have the character of examples. Naturally, within the scope of the invention defined by independent claims, one or more described features can also be omitted, modified or complemented. The features of different embodiments can naturally also be combined with one another. The decisive factor is that the concept of the invention is substantially implemented. If a feature is to be implemented at least partially, then this includes that this feature is also implemented completely or implemented at least substantially completely. "Substantially" here means, in particular, that the implementation allows the achievement of the desired use to a perceptible extent. In particular, this means that a corresponding feature is at least 50%, 90%, 95% or 99% implemented. If a minimum amount is indicated, obviously more than this minimum amount can be used. If the number of a component is indicated to be at least one, then this also includes, in particular, embodiments with two, three or another plurality of components. That which is described for one object can also be used for the vast majority or for all of the other objects of similar type. Unless indicated, the end points are included in the intervals. Below, "a(n)" is intended to mean the indefinite article and it can have the meaning of a "single" or "at least one." Reference is made below to the:

DESCRIPTION OF THE FIGURES

FIG. 2B partial shell of a housing of the air supply device according to FIGS. 2 and 3

FIG. 2C enlarged longitudinal section through a pad and an air supply device arranged therein, wherein half of a blade wheel and of a blade wheel support has been removed, in order to make the uncoupling device located beneath visible.

DESCRIPTION OF THE INVENTION

Figure 1A:
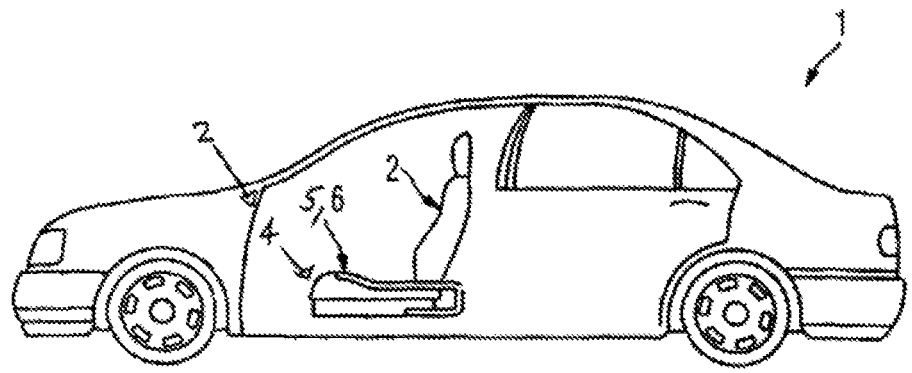
FIG. 1A longitudinal section through a vehicle with a seat with a ventilation device with an air supply device FIG. 1B longitudinal section through a pad of a first seat with ventilation device FIG. 1C longitudinal section through a pad of a second seat with ventilation device FIG. 2A uncoupling device of an air supply device according to FIGS. 2 and 3
Figure 1B:
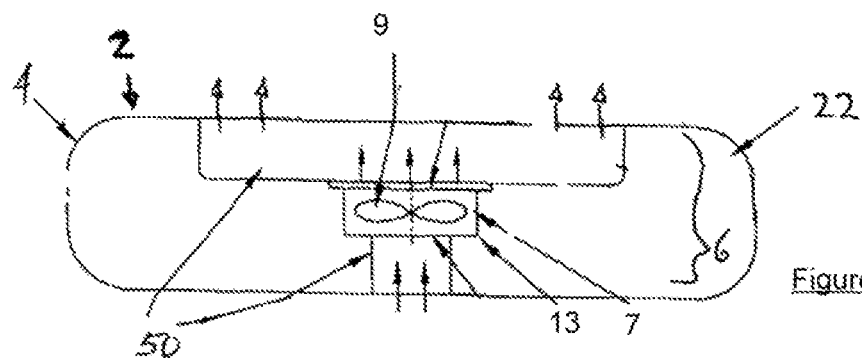
Figure 1C:
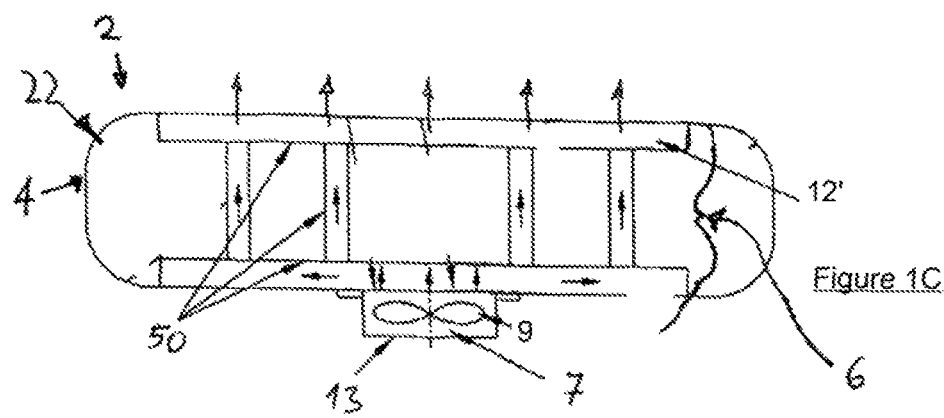

The present invention relates to a vehicle according to FIG. 1. A vehicle is understood to mean a device for transporting persons and/or goods, such as land vehicles, watercraft, rail vehicles or aircraft, in particular aircraft, ships and automobiles.

The present invention relates to a vehicle 1. Here, the term "vehicle" is understood to mean a particular device for transporting persons and/or goods. Conceivable are, for example, land vehicles, watercraft, rail vehicles and aircraft, in particular aircraft, ships and automobiles.

The invention moreover relates to a climate controlled system 2. The term "climate controlled system" pertains particularly to an object that is to be influenced with regard to at least one air conditioning parameter, that is to say that is subject to a control and/or regulation, in particular in order to bring said parameter to a certain target value or within a target range at least briefly and/or to maintain it there in a lasting manner. This applies particularly to those portions of the surface thereof which can come in contact with a medium in accordance with the intended use thereof or which can at least potentially come in contact with a user during use of the object. In particular, "controlled system" relates to an object that is subject to control and/or regulation with regard to a variable. The term "air conditioning parameter" includes, in particular, at least one air conditioning variable, for example, temperature, atmospheric humidity, air composition and/or fluid flow rate. As in this case, application possibilities are air conditioned seats or steering wheels, seat covers, office equipment, covering elements of passenger compartments, storage reservoirs, fuel lines or housings of batteries, motors or other functional elements. However, it is also possible to provide that the climate controlled system 2 is a zone to be ventilated, in particular in a vehicle 1. For example, in the case of vehicles with open convertible top, the head and shoulder area of a passenger can be supplied with a uniform current of air at a desired temperature, in order to compensate for vortexes caused by the turbulence.

Advantageously, at least one climate controlled system 2 comprises at least one pad 22. "Pad" is understood to mean, in particular, a device for damping impacts and/or for distributing local pressure peaks over a larger area. Blocks made of foamed polyurethane are mentioned as example.

Preferably, at least one climate controlled system 2 comprises at least one cover 4. The term "cover" refers in particular to a fabric that is arranged at least in sections on the surface of an object. For example, air impermeable or air permeable layers are conceivable, which include perforated or unperforated leather and/or textiles and are arranged on a pad, or skins that cover at least a portion of a surface of a foam-like material.

The present invention also relates to an air conditioning device 5. The word "air conditioning device" comprises, in particular, an object that is suitable for influencing a controlled system with regard to at least one air conditioning parameter, in particular, in order to bring it at least briefly to a certain target value or within a target range, and/or to maintain it there in a lasting manner. This allows temperature control, ventilation, humidifying and dehumidifying and/or air conditioning. In particular, temperature control and/or air conditioning of a seat are appropriate for longer car drives or for pre-controlling the temperature of fuel.

Advantageously, at least one air conditioning device 5 has at least one ventilation device 6. "Ventilation device" here is understood to mean in particular a device that can be used for the targeted changing of the air composition or of the air flows in a certain superficial or spatial area, for example, an on-board air conditioner, at least partially air permeable spacer media, spacer fabrics and/or air conditioning feeders. This allows the ventilation of at least one climate controlled system 2, for example, of a surface of an object, in particular for the dehumidifying or controlling the temperature of surfaces of a climate controlled system 2 that are close to or touched by persons.

Advantageously, at least one ventilation device 6 comprises at least one air supply device 7. The designation "air supply device" includes, in particular, a device for moving air. Axial blowers or radial blowers are conceivable, for example.

The ventilation device 6 preferably comprises an air distribution device, for example, channels in the pad 22. Such a channel 50 connects the front A side facing a passenger in an air permeable manner to a rear B side facing away from the passenger. The channel 50 preferably has a receiving section 60. Therein, preferably at least one air supply device 7, for example, in the form of a blower, is accommodated. The receiving section 60 is arranged here on the B side of the pad 22. The channel 50 preferably has, in addition, a supply section 80, through which air can be exchanged between the air supply device 7 and the pad side spaced apart from it, here the A side. In the receiving section 60, the clear cross section of the channel 50 is greater than in the supply section 80.

The air supply device 7 preferably has a blade wheel 9, a motor that drives the blade wheel 9, a blade wheel support 12, and a housing 13.

The blade wheel support 12 is preferably a rigid component that is used as a bearing relative to which the blade wheel can rotate. It consists, for example, of a ring that is arranged concentrically about the blade wheel. On this blade wheel support 12, the motor and hence indirectly also the blade wheel 9 are mounted. The blade wheel support 12 is preferably made at least partially from hard plastic or another polymer. It can be implemented as a pipe section or also, for example, as a round disk.

The housing 13 surrounds the blade wheel support 12 at least partially and is arranged spaced apart therefrom. It is used to encapsulate the air supply device 7 for protection against external mechanical stresses. It is preferably made at least partially of plastic.

The housing 13 preferably comprises at least two partial shells 24. Such a partial shell 24 is preferably formed in the shape of a cup or shell. It has at least one opening in its bottom in order to allow air to enter the outer housing 13 and the air supply device 7. Preferably, two similar partial shells 24 a, b are provided, the shape of which is identical. They are arranged from mutually opposite sides of the blade wheel 9 around the blade wheel support around the blade wheel 9. The rotation axes thereof and the rotation axes of the blade wheel are preferably identical here. The respective largest opening thereof is arranged edge-to-edge with the largest opening of the respective other partial shell 24 a, b. Preferably, they are in direct contact with one another by the fitting edges thereof, without the intermediate arrangement of additional components, and thereby they close off the outer housing peripherally with respect to the outside. Due to the direct mutual bracing, the housing 13 is also pressure resistant under radial stress. As a result, the housing 13 receives a flat ring or discus shape.

Between blade wheel support and outer housing 13, an uncoupling device 14 is arranged. It is used simultaneously for embedding the blade wheel support 12 and the blade wheel 9 in the housing 13 and for vibration uncoupling in order not to transmit vibrations of the blade wheel 9 to the surroundings, for example, the pad 22.

The uncoupling device 14 comprises at least one force transmission device 16, which is connected to the elastomer ring 15. It holds the elastomer ring 15 and the housing portion associated therewith spaced apart from the respective other housing portion. The force transmission device 16 is preferably made of the same material as the elastomer ring 15 and of one piece. In the present example, it has a funnel-like shape. The larger opening of the funnel corresponds to the inner diameter of the housing 13, and the smaller opening corresponds to the elastomer ring 15.

Preferably, at least two force transmission devices 16a,b are provided. The at least two force transmission devices 16a,b may be disposed on opposing sides of a transverse plane 100 of the at least one blade wheel support 12. They extend preferably at an inclination relative to the rotation plane of the blade wheel 9. Preferably, the inclination angles thereof relative to the rotation plane have opposite algebraic signs. The first force transmission device 16a preferably supports at an upward slant and the second supports at a downward slant. Preferably, the interior angle 17 between the two force transmission devices 16 is greater than 90 degrees. This allows a larger deflection of the blower 7 within the rotation plane. At the same time, in the case of shocks due to unevenness of the roadway, they are not deflected as strongly from the rotation plane.

In order to optimize the effect of the force transmission devices 16, they are secured on the side thereof that is spaced apart from the elastomer ring 15 on the housing portion associated with them. In the present embodiment example, they are thus fastened to the housing 13. This can occur or be assisted by gluing together.

In the present case, the fastening is carried out by clamping in between the partial shells 24 of the housing, without this being visible from outside. Indeed, the uncoupling device 14 is completely covered by the housing 13 in the side view of the blower 7.

For this purpose, the partial shells 24 are provided in each case with one or more clamping elements 25. Such a clamping element 25 can be a ring-shaped protrusion that extends peripherally around the housing 13 and protrudes in each case into the respective other partial shell 24. However, if the uncoupling device 14 comprises two force transmission devices 16 and the two are to be clamped together, then a plurality of individual elements is more advantageous. In this case, the partial shells 24 in each case have a plurality of clamping elements 25 that protrude into the respective opposite partial shell 24 and clamp in the uncoupling device 14 to be attached or the force transmission devices 16, in each case at isolated points, between the respective clamping element 25 and the opposite partial shell 24. For example, a clamping element 25 can be provided on a partial shell 24 every 30 degrees peripherally about the rotation axis.

The partial shells 24 used here are identical in terms of the shape thereof. However, they are in a mirror arrangement relative to the rotation plane of the blade wheel and, in addition, they are arranged rotated by an angle about the rotation axis of the blade wheel 9. In the embodiment example, the angle is 15 degrees. Thus, if two such partial shells 24 engage in a rotated state in one another, then a clamping element 25 is directed toward the respective other partial shell 24 alternatingly every 15 degrees.

By means of the proposed construction, the two force transmission devices 16 of the uncoupling devices 14 can be fastened simultaneously, without an additional work step being required for this purpose. Moreover, only one type of partial shell 24 is needed. The radial load bearing capability and the radial vibration uncoupling are optimized simultaneously.

The invention claimed is:

1. An air supply device comprising:
   a. a blade wheel,
   b. a housing, which delimits the blade wheel relative to surroundings at least to some extent,
   c. a blade wheel support, relative to which the blade wheel is movably mounted, and which supports the blade wheel at least indirectly, and
   d. an uncoupling device, in order to space the blade wheel support and the housing apart from one another, and uncouples the housing from vibrations of the blade wheel support and of the blade wheel;
   wherein at least one of the blade wheel support and the uncoupling device is arranged within the housing; and
   wherein the uncoupling device comprises at least two force transmission devices, disposed on opposing sides of a transverse plane of the blade wheel support.

2. The air supply device according to claim 1, wherein the blade wheel is spring-mounted relative to the housing and in that, relative to the housing, with application of a force of equal magnitude, the blade wheel can be deflected farther radially with respect to a rotation axis of the blade wheel than along the rotation axis of the blade wheel.

3. The air supply device according to claim 1, wherein the air supply device is an element of the following group: a blower, an axial blower, or a radial blower.

4. The air supply device according to claim 1, wherein the housing comprises at least two partial shells that have at least one of the following features:
   the two partial shells have an identical shape,
   the two partial shells are rotationally symmetrical parts,
   rotation axes of the two partial shells are positioned extending on a same straight line,
   the rotation axes of the two partial shells are arranged identically to a rotation axis of the blade wheel,
   relative to a rotation plane of the blade wheel, the two partial shells are arranged at least partially on mutually different sides of the blade wheel,
   one of the partial shells is in a mirror arrangement relative to the other partial shell and arranged rotated about the rotation axis of the blade wheel by an angle greater than 0 and less than 180 degrees,
   each of the two partial shells has at least one opening facing a respective other partial shell so that there are two openings, these openings are of equal size and formed identically, and margins of the two openings are arranged so that the margins of the two openings are congruent with one another.

5. The air supply device according to claim 1, wherein the uncoupling device has at least three connection areas which connect the at least two force transmission devices to the blade wheel support and the housing.

6. The air supply device according to claim 5, wherein the at least three connection areas and the at least two force transmission devices are formed in one piece.

7. The air supply device according to claim 5, wherein the at least three connection areas uniformly distribute the mechanical forces upon the housing, the blade wheel support, or both.

8. The air supply device according to claim 1, wherein the at least two force transmission devices have an inclination relative to a rotation axis of the blade wheel that is from zero to 60 degrees.

9. The air supply device according to claim 1, wherein at least one of the following components is in the shape of a ring which is arranged concentrically about a rotation axis of the blade wheel at least in sections: the blade wheel support, the uncoupling device, the at least two force transmission devices, the housing, at least two partial shells.

10. The air supply device according to claim 1, wherein the at least two force transmission devices have an inclination relative to a rotation axis of the blade wheel and the inclination of the at least two force transmission devices differ from one another.

11. The air supply device according to claim 10, wherein the inclination of the at least two force transmission devices, relative to the rotation axis of the blade wheel, have opposite algebraic signs from one another.

12. The air supply device according to claim 1, wherein all components of the uncoupling device are formed in one piece.

13. A seat with the air supply device according to claim 1.

14. A vehicle with the air supply device according to claim 1.

15. The air supply device according to claim 1, wherein all components of the uncoupling device are formed in one piece from an elastomer casting material.

16. The air supply device according to claim 15, wherein the uncoupling device is formed of a polymer.

17. The air supply device according to claim 1, wherein the at least two force transmission devices have a V-shaped profile.

18. The air supply device according to claim 1, wherein
   each of the at least two force transmission devices have at least two force introduction areas that are spaced apart from one another,
   a first of the at least two force introduction areas being associated with the blade wheel support and a second of the at least two force introduction areas with the housing,
   in that at least one of the at least two force introduction areas is arranged between one of at least three connection areas and one of the at least two force transmission devices, and
   the at least two force transmission devices transmit mechanical forces with the at least two force introduction areas.

19. The air supply device according to claim 18, wherein the at least two force introduction areas of the at least two force transmission devices are on a different level relative to a longitudinal extent of a rotation axis of the blade wheel.

20. The air supply device according to claim 18, wherein a straight line drawn through the at least two force introduction areas of the at least two force transmission devices and a rotation axis of the blade wheel has an inclination relative to the rotation axis of the blade wheel that is from zero to 60 degrees.

* * * * *